No. 750,574. PATENTED JAN. 26, 1904.
F. A. BICKET.
TWINE HOLDER AND TENSION DEVICE FOR HARVESTERS.
APPLICATION FILED APR. 21, 1903.
NO MODEL.
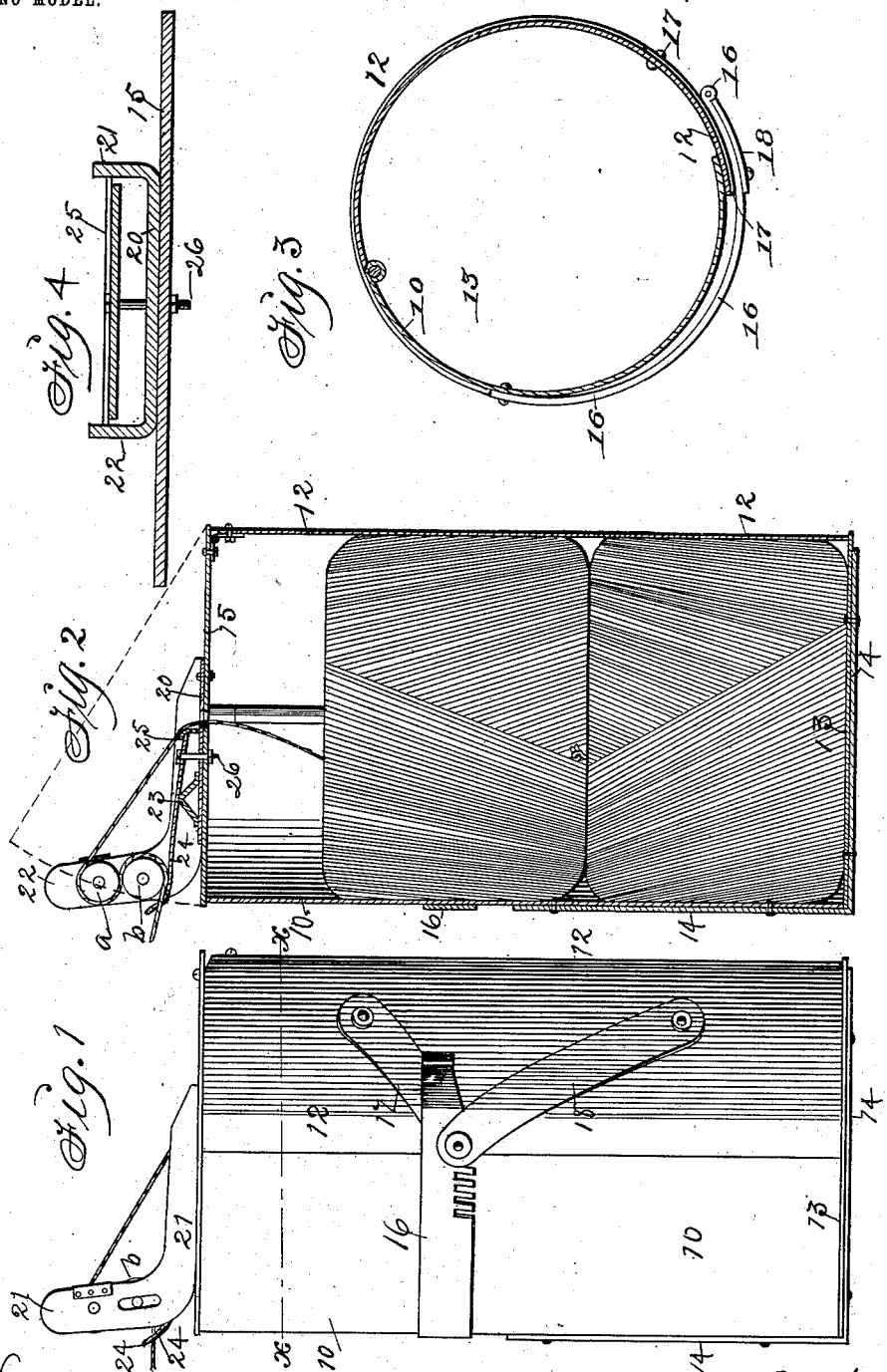

No. 750,574.

Patented January 26, 1904.

UNITED STATES PATENT OFFICE.

FRANK A. BICKET, OF TRAER, IOWA.

TWINE-HOLDER AND TENSION DEVICE FOR HARVESTERS.

SPECIFICATION forming part of Letters Patent No. 750,574, dated January 26, 1904.

Application filed April 21, 1903. Serial No. 153,712. (No model.)

*To all whom it may concern:*

Be it known that I, FRANK A. BICKET, a citizen of the United States, residing at Traer, in the county of Tama and State of Iowa, have invented a new and useful Twine-Holder and Tension Device for Harvesters, of which the following is a specification.

My object is to provide an adjustable tension device and twine-holder that can be readily adjusted for retaining balls of twine of different sizes at different times as required to retain the balls stationary while the twine is drawn therefrom and to connect two balls within the holder as required to avoid putting the end of the twine of each ball through the binder-needle and stopping the machine for so doing every time one ball of twine is consumed.

My invention consists in the construction and combination of parts as hereinafter set forth, pointed out in my claims, and illustrated in the accompanying drawings, in which—

Figure 1 is a side elevation of the twine-holder and tension device fixed on its top as required for practical use, and Fig. 2 is a vertical sectional view showing two balls of twine connected in the holder and the end of the twine extended through the tension device fixed on top of the holder. Fig. 3 is a transverse sectional view on the line $x\ x$ of Fig. 1 looking downward. Fig. 4 is an enlarged transverse sectional view of the tension device fixed on top of the twine-holder case.

The numeral 10 designates one of the sections of a cylindrical sheet-metal case, and 12 the other section hinged thereto, as shown in Fig. 3, or in any suitable way, in such a manner that the diameter of the case can be expanded or contracted to adapt the case for balls of twine differing in size. A bottom 13 is fixed to the section 10 and reinforced by an angle-iron 14, fixed across the bottom on its under side and to the outside face of the section by means of rivets, as shown in Fig. 2, or in any suitable way. A cover 15 is hinged to the top of the section 12 to open upward, as indicated by dotted lines in Fig. 2, for admitting balls of twine. A latch 16, provided with notches, as shown in Fig. 1, is pivoted to the outside and central portion of the section 10, and two metal straps 17 and 18 are fixed to the outside of the section 12 to extend toward each other to be connected by a fixed stud 19, as shown in Fig. 1, in such a manner that there will be an open space between them to admit the notched end of the latch to drop between them and to allow the stud to enter one of the notches of the latch as required to lock the free vertical edge portions of the hinged sections together when adjusted to suit the diameters of the balls of twine to be placed in the twine-holder case.

The twine-holder fixed on top of the hinged cover 15 consists of a frame that has a flat bottom 20 and parallel elbow-shaped sides 21 and 22. At its inner end portion is an aperture for the passage of twine through a coinciding aperture in the cover, and in the parallel top portions of the sides are mounted two rollers, around which twine is passed, as shown in Fig. 2. A support 23 for a leaf-spring 24 is fixed on top of the bottom part of the frame, as shown in Fig. 2, or in any suitable way, and a shield 25 for the twine is fixed to the frame to project over the rear end of the spring and a screw-bolt 26 is extended through the spring, the bottom of the frame, and the hinged cover, and a nut placed on the end of the bolt for regulating the tension of the spring that presses the twine against the lower roller. A slot in the free front end of the spring allows the twine to pass through the slot toward the needle of a binder as required in practical use.

Having thus described the purpose of my invention, its construction and operation, the practical utility thereof will be readily understood by persons familiar with the art to which it pertains, what I claim as new, and desire to secure by Letters Patent, is—

1. In a twine-holder for harvesters, a cylindrical case consisting of two sections hinged together at their vertical edges, a bottom fixed to one section, a cover hinged to one section, and means for adjustably connecting the free edges of the sections, for the purposes stated.

2. A twine-holder case for harvesters composed of two sections hinged together at their edges, a bottom fixed to one of the sections, a cover hinged to one of the sections and provided with an aperture at its central portion, a latch, having a plurality of notches, pivoted to the outside and center of one of the hinged sections and straps fixed to the outside of the other section and connected at their ends by means of a fixed stud, for the purposes stated.

3. An adjustable twine-holder and tension device comprising a cylindrical case consisting of two sections hinged together, a fixed bottom on the end of one section, a hinged cover at the top of one section, a pivoted latch on the outside and center of one section provided with notches and straps fixed to the outside of the other section and their ends connected by a fixed stud, and a tension device fixed on top of the hinged cover, arranged and combined to operate in the manner set forth for the purposes stated.

FRANK A. BICKET.

Witnesses:
B. F. THOMAS,
J. L. THOMAS.